United States Patent Office 3,814,798
Patented June 4, 1974

---

3,814,798
CONTROL OF INSECTS AND NEMATODES WITH VINYL PHOSPHATE DERIVATIVES
Henry Martin and Josef Drabek, Basel, Switzerland, assignors to Ciba-Geigy AG, Basel, Switzerland
No Drawing. Original application May 18, 1970, Ser. No. 38,570, now Patent No. 3,705,904, dated Dec. 12, 1972. Divided and this application Dec. 7, 1972, Ser. No. 314,201
Claims priority, application Switzerland, May 19, 1969, 7,679/69; July 22, 1969, 11,193/69
Int. Cl. A01n 9/22, 9/24, 9/36
U.S. Cl. 424—200                     6 Claims

---

ABSTRACT OF THE DISCLOSURE

Vinyl phosphate derivatives, including particularly compounds of the formula

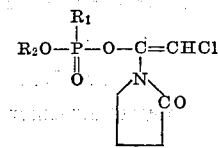

in which (a) $R_1$ is methoxy and $R_2$ is methyl or (b) $R_1$ is ethoxy and $R_2$ is ethyl, are useful as pesticidal agents, particularly in the control of insects and nematodes.

---

This is a division of application Ser. No. 38,570 filed on May 18, 1970, now U.S. Pat. 3,705,904.

This invention is converned with new, broad-spectrum phosphates for the control of nematodes, insects and pests belonging to the order acarina at all stages of development, and with their use, either *per se* or in preparations, in the control of pests.

These compounds are also effective against undesired plant growth, bacteria and fungi, and also against gastropods. They also have a chemosterilizing action on insects.

The new active principles correspond to the formula

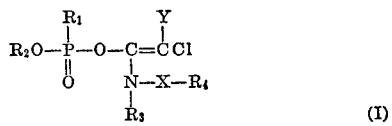

in which $R_1$ represents an alkyl group having 1 to 4 carbon atoms or an alkoxy group having 1 to 4 carbon atoms, $R_2$ represents an alkyl group having 1 to 4 carbon atoms, X represents a —CO— or an —SO$_2$— group and Y represents a hydrogen or a chlorine atoms, $R_3$ representing an alkyl group having 1 to 4 carbon atoms when Y is a hydrogen atom, and $R_4$ represents an alkyl group having 1 to 4 carbon atoms, a cycloalkyl group having 3 to 6 carbon atoms or a phenyl radical substituted by a halogen or an alkyl group having 1 to 4 carbon atoms, or a hydrogen atom when X is a CO group, and in which $R_3$ and $R_4$, together with the symbols N and X, can also constitute a five-membered to seven-membered heterocycle containing at least one CO or SO$_2$ group, or in which, when Y is a chlorine atom, $R_3$ represents an alkyl group having 1 to 4 carbon atoms or a phenyl radical that may be unsubstituted or substituted by a halogen or an alkyl group having 1 to 4 carbon atoms, and $R_4$, provided $R_3$ represents an alkyl group, represents a phenyl radical that may be unsubstituted or substituted by a halogen, an alkyl group having 1 to 4 carbon atom and/or NO$_2$, whereas, on the other hand, $R_4$, provided $R_3$ represents a phenyl radical that may be substituted, represents an alkyl group having 1 to 4 carbon atoms, or a hydrogen atom when X is a CO group, or $R_3$ and $R_4$, together with the symbols N and X, can constitute a five-membered to seven-membered heterocycle containing at least two carbonyl groups or a heterocycle fused to a benzene nucleus or to a cyclohexyl ring.

The term "alkyl group containing 1 to 4 carbon atoms" as used herein refers primarily to methyl, ethyl or propyl group, the term "alkoxy group containing 1 to 4 carbon atoms" refers to methoxy, ethoxy or propoxy groups, and the term "cycloalkyl group containing 3 to 6 carbon atoms" refers, in particular, to cyclopropyl and cyclohexyl groups. The term 'halogen" as used herein refers to fluorine, chlorine, bromine and iodine, but especially to chloride or bromine.

An important group belong to the series of compounds represented by Formula I are those corresponding to Formula II

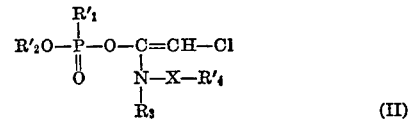

in which $R'_1$ represents a methyl, ethyl, methoxy or ethoxy group, $R'_2$ represents a methyl or ethyl group, X represents a —CO— or an —SO$_2$ group, but especially a —CO— group, $R_3$ represents an alkyl group having 1 to 4 carbon atoms and $R'_4$ represents an alkyl group having 1 to 4 carbon atoms, a cyclopropyl group or a phenyl radical substituted by a halogen atom or an alkyl group having 1 to 4 carbon atoms, or may represent a hydrogen atom when X is a —CO— group, or in which $R'_3$ and $R'_4$, together with the symbols N and X, can form a five-membered to seven-membered heterocycle containing at least one carbonyl group, with X representing —CO—.

Another important group belonging to the series of compounds represented by Formula I are those corresponding to Formula III

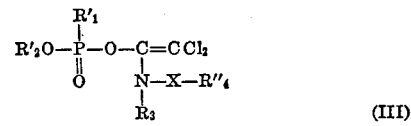

in which $R'_1$ represents a methyl, ethyl, methoxy or ethoxy group, $R'_2$ represents a methyl or ethyl group, X represents a —CO— or —SO$_2$— group, $R_3$ represents an alkyl group having 1 to 4 carbon atoms or a phenyl radical that may be unsubstituted or substituted by a halogen atom or an alkyl group containing 1 to 4 carbon atoms, and $R''_4$, provided $R_3$ is an alkyl group, represents a phenyl radical substituted by a chlorine atom, a methyl group and/or $NO_2$, whereas $R''_4$, when $R_3$ is a phenyl radical that may be substituted, represents an alkyl group containing 1 to 4 carbon atoms, or is a hydrogen atom when X is a —CO— group, or in which $R_3$ and $R''_4$, together with the substituent N and the substituent X constituting a —CO— group, form a five-membered to seven-membered heterocycle containing at least two carbonyl groups or a heterocycle fused to a benzene nucleus.

An important sub-group of compounds belonging to the series represented by Formula III are those in which $R'_1$ represents a methoxy or an ethoxy group.

The new compounds of Formula I can be used as pesticides together with one or more of the following additives: a carrier, a solvent, a diluent, a dispersing agent, an emulsifying agent, a thickening agent, an adhesive, a wetting agent and/or a fertilizer and, if necessary, a known pesticide or a bait.

The advantage of the new compounds, in additon to their broad-spectrum action in combating various plant and animal pests, is their stability towards alkalis, which makes them eminently suitable for use in cattle dips, for example, for the control of ectoparasites, for application in rice fields and, in general, for application in soil, for example, for the control of soil-dwelling insects, acarids and nematodes and for the control of certain bacteria, fungi and weeds.

The animal pests include, in particular, insects and members of the order acarina, for example, mites and ticks, including the different stages of metamorphosis, that is to say, eggs, larvae, nymphs and pupae.

The compounds of Formula I can be used, for example, against all harmful insects, for example, aphids, for example, the potato aphid (*Myzus persicae*) and the black bean aphid (*Doralis fabae*); shield lice, for example, *Aspidiotus hederae, lecanium hesperidium* and *Pseudococcus maritimus;* thysanoptera, for example, *Hercinothrips femoralis,* and bugs, for example, the beet leaf bug (*Piesma quadrata*) and the bedbug (*Cimex lectularius*); butterfly larvae, for example, *Plutella maculipennis* and *Lymantria dispar;* beetles, for example, corn weevils (*Sitophilus granarius*) and Colorado beetles (*Leptinotarsa decomlineata*), and also the soil-dwelling larvae, for example, wire worms (Agriotes sp.) and cockchafer larvae (*Melolontha melolontha*); cockroaches, for example, the German cockroach (*Blattella germanica*); the cricket (*Gryllus domesticus*); termites, for example, Reticulitermes; hymenoptera, for example, ants; lepidoptera, for example, *Chilo suppressalis;* diptara, for example, the fruit fly *Drosophila melanogaster,* the Mediterranean fruit fly *Ceratitis capitata,* the housefly (*Musca domestica*) and gnats, for example, *Aedes aegypti* and *Anopheles stephensi.*

The compounds of Formula I are also specially efficient at controlling members of the order acarina, for example, Eulaelaps, Echinolaelaps, Laelaps, Haemoganmasus, Dermanyssus, Ornithonyssus, Allodermanyssus, especially *Allodermanyssus sanguineus,* Pneumonyssus, Amblyomma, Aponomma, Boophilus, Dermancentor, Haemophysalis, Hyalomma, Ixodes, Margaropus, Rhipicephalus, Ornithodirus; Otobius, Chelyletidae, for example, Cheyletus, Psorergates, Demodicidae, Trombiculidae, for example, Trombicula, Eutrombicula, Schöngastia, Acomatacurus, Neoschōngastia, Euschōngastia, Sarcoptiformes, for example, Notoedres, Sarcoptes, Knemidokoptes, Psoroptidae, for example, Psoroptes, Choripotes, Otodectes or Tetranychidae, for example, *Tetranychus telarius; Tetranychus urticae.*

Nematodes that may be mentioned, particularly phytopathogenic nematodes, are those belonging to the following orders:

Aphelenchoides, for example, *Aphelenchus ritzemabosi, Aphelenchus fragariae, Aphelenchus oryzae,* Ditylenchoides, for example, *Ditylenchus dipsaci,* meloidogynes, for example, *Meloidogyne arenaria, Meloidogyne incognita,* cyst-forming nematodes (heterodera), for example, *Heterodera rostochiensis, Heterodera schachtii,* and also root nematodes, for example, Paratylenchus, Rotylenchus, Xiphinema and Rhadopholus.

Pesticidal preparations, generally containing 0.1 to 95 percent by weight, preferably 1 to 85 percent by weight, of the new compounds of Formula I (or Formulae II or III) can be made up in a wide variety of forms, for example, in the form of dry or moist preparations or as liquids or solids. Shaped carriers such as fly-dishes, flypapers, paper strips or granules can be impregnated with the active principles. The active principles can also be transformed into a gas phase by means of sprays.

However, they can also be used in almost pure form without additives when applied from spraying devices producing a fine enough spray. The main means of application of this kind would be spraying from aircraft.

The solvents used in the preparation of solutions of compounds of Formula I that can be used directly as sprays are, for example, mineral oil fractions having a high to medium boiling range, for example, Diesel oil or kerosene, coal-tar oil and oils of vegetable or animal origin, as well as hydrocarbons, for example, alkylated naphthalenes, tetrahydronaphthalene, if necessary, in conjunction with xylene mixtures, cyclohexanols and ketones, and also chlorinated hydrocarbons, for example, trichloroethane, trichloroethylene or tri- and tetra-chlorobenzenes. It is advantageous to use organic solvents having a boiling point above 100° C.

The aqueous preparations are advantageously prepared by the addition of water to emulsion concentrates, pastes or wettable powders. Suitable emulsifying or dispersing agents are non-ionic products, for example, condensation products of aliphatic alcohols, amines or carboxylic acids having a long-chain hydrocarbon radical containing about 10 to 20 carbon atoms and ethylene oxide, for example, the condensation product of octadecyl alcohol and 25 to 30 mols of ethylene oxide, or the condensation product of commercial oleylamine and 15 mols of ethylene oxide or the condensation product of dodecylmercaptan and 12 mols of ethylene oxide. The following are examples of suitable anionic emulsifying agents: the sodium salt of dodecyl alcohol sulphuric acid ester, the sodium salt of dodecylbenzenesulphonic acid, the potassium or triethanolamine salt of oleic acid or abietic acid or mixtures of these acids, or the sodium salt of a petroleum sulphonic acid. Suitable cationic dispersing agents are quaternary ammonium compounds, for example, cetylpyridinium bromide or dihydroxyethylbenzyldodecylammonium chloride.

Dusting and strewing preparations can be prepared by using solid carriers, for example, talcum, kaolin, bentonite, calcium carbonate, calcium phosphate, and also charcoal, cork meal, wood flour and other materials of vegetable origin. It is also highly advantageous to make preparations in granular form. The preparations in their various forms can also be provided with substances that improve dispersion, adhesion, rain-resistance and penetration; substances of this kind are, for example, fatty acids, resins, glues, casein or alginates.

The compounds of the invention can be used either alone or together with known pesticides, especially insecticides, acaricides, nematicides, bactericides, fungicides, and so forth.

The action of the phosphorus compounds of the invention can be enhanced by synergists. Suitable substances are, for example, sesamin, sesamex, piperonyl cyclonenes, piperonyl butoxide, piperonal bis[2 - (2 - butoxyethoxy) ethyl]acetate, sulphoxides, propyl isomers, N-(2-ethylhexyl)-5-norbornene-2,3-dicarboxamide, octachlorodipropylether, 2-nitrophenylpropargylether, 4-chloro-2-nitrophenylpropargylether and 2,4,5-trichlorophenylpropargylether.

Known insecticides, acaricides or nematicides can be added to broaden the spectrum of action of the compounds of the invention.

The following are given as examples:

PHOSPHORIC ACID DERIVATIVES bis-OO-diethylphosphoric acid anhydride (TEPP)
O,O,O,O-tetrapropyldithiopyrophosphate
dimethyl(2,2,2-trichloro-1-hydroxyethyl)phosphonate (Trichrorfon)
1,2-dibromo-2,2-dichloroethyldimethylphosphate (Naled)
2,2-dichlorovinyldimethylphosphate (Dichlorfos)
2-methoxycarbamyl-1-methylvinyldimethylphosphate (Mevinphos)
dimethyl-1-methyl-2-(methylcarbamoyl)vinylphosphate cis (Monocrotophos)
3-(dimethoxyphosphinyloxy)-N-methyl-N-methoxy-cis-crotonamide
3-(dimethoxyphosphinyloxy)-N,N-dimethyl-cis-crotonamide (Dicrotophos)
2-chloro-2-diethylcarbamoyl-1-methylvinyldimethyl-phosphate (Phosphamidon)
O,O-diethyl-O(or S)-2-(ethylthio)-ethylthiophosphate (Demeton)
S-ethylthioethyl-O,O-dimethyl-dithiophosphate (Thiometon)
O,O-diethyl-S-ethylmercaptomethyldithiophosphate (Phorate)
O,O-diethyl-S-2-[(ethylthio)ethyl]dithiophosphate (Disulfoton)
O,O-dimethyl-S-2-(ethylsulphinyl)ethylthiophosphate (Oxydemetonmethyl)
O,O-dimethyl-S-(1,2-dicarethoxyethyl)dithiophosphate (Malathion)
O,O,O,O-tetra-ethyl-S,S'-methylene-bis-[dithiophosphate] (Ethion)
O-ethyl-S,S-dipropyldithiophosphate
O,O-dimethyl-S-(N-methyl-N-formylcarbamoyl-methyl)-dithiophosphate (Formotion)
O,O-dimethyl-S-(N-methylcarbamoylmethyl)-dithiophosphate (Dimethat)
O,O-dimethyl-S-(N-ethylcarbamoylmethyl)dithiophosphate (Ethoat-methyl)
O,O-diethyl-S-(N-isopropylcarbamoylmethyl)-dithiophosphate (Prothoat)
S-N-(1-cyano-1-methylethyl)carbamoylmethyldiethylthiophosphate (Cyanthoat)
S-(2-acetamidoethyl)-O,O-dimethyldithiophosphate
hexamethylphosphoric acid triamide (HEMPA)
O,O-dimethyl-O-para-nitrophenylthiophosphate (Parathion-methyl)
O,O-diethyl-O-para-nitrophenylthiophosphate (Parathion)
O-ethyl-O-para-nitrophenylphenylthiophosphonate (EPN)
O,O-dimethyl-O-(4-nitro-meta-tolyl)thiophosphate Fenitrothion)
O,O-dimethyl-O-(2-chloro-4-nitrophenyl)thiophosphate (Dicapthon)
O,O-dimethyl-O-para-cyanophenylthiophosphate (Cyanox)
O-ethyl-O-para-cyanophenylphenylthiophosphonate
O,O-diethyl-O-2,4-dichlorophenylthiophosphate (Dichrofenthion)
O-2,4-dichlorophenyl-O-methylisopropylamidothiophosphate
O,O-dimethyl-O-2,4,5-trichlorophenylthiophosphate (Ronnel)
O-ethyl-O-2,4,5-trichlorophenylethylthiophosphonate (Trichloronat)
O,O-dimethyl-O-2,5-dichloro-4-bromophenylthiophosphate (Bromophos)
O,O-diethyl-O-2,5-dichloro-4-bromophenylthiophosphate (Bromphos-ethyl)

O,O-dimethyl-O-(2,5-dichloro-4-iodophenyl)-thiophosphate (Iodofenphos)
4-tert. butyl-2-chlorophenyl-N-methyl-O-methylamidophosphate (Crufomat)
dimethyl-para-(methylthio)phenylphosphate
O,O-dimethyl-O-(3-methyl-4-methylmercaptophenyl)thiophosphate (Fenthion)
isopropylamino-O-ethyl-O-(4-methylmercapto-3-methylphenyl)-phosphate
O,O-diethyl-O-para-[(methylsulphynyl)phenyl]-thiophosphate (Fensulfothion)
O,O-dimethyl-O-para-sulphamidophenylthiophosphate
O-[para-(dimethylsulphamido)phenyl]O,O-dimethyl-thiophosphate (Famphur)
O,O,O',O'-tetramethyl-O,O'-thiodi-para-phenylenethiophosphate
O-(para-(para-chlorophenylazophenyl)O,O-dimethyl-thiophosphate (Azothoat)
O-ethyl-S-phenylethyldithiophosphonate
O-ethyl-S-4-chlorophenylethyldithiophosphonate
O-isobutyl-S-para-chlorophenylethyldithiophosphonate
O,O-dimethyl-S-para-chlorophenylthiophosphate
O,O-dimethyl-S-(para-chlorophenylthiomethyl)-dithiophosphate
O,O-diethyl-para-chlorophenylmercaptomethyldithiophosphate (Carbophenothion)
O,O-diethyl-S-para-chlorophenylthiomethylthiophosphate
O,O-dimethyl-S-(carbethoxyphenylmethyl)dithiophosphate (Phenothoat)
O,O-diethyl-S-(carbofluoroethoxyphenylmethyl)-dithiophosphate
O,O-dimethyl-S-(carboisopropoxyphenylmethyl)-dithiophosphate
O,O-dimethyl-O-(alpha-methylbenzyl-3-hydroxy-crotonyl)-phosphate
2-chloro-1-(2,4-dichlorophenyl)vinyldiethylphosphate (Chlorfenvinphos)
2-chloro-1-(2,4,5-trichlorophenyl)vinyl-dimethylphosphate
O-(2-chloro-1-(2,5-dichlorophenyl)vinyl-O,O-diethyl-thiophosphate
phenylglyoxylonitriloxime-O,O-diethylthiophosphate (Phoxim)
O,O-diethyl-O-(3-chloro-4-methyl-2-oxo-2-H-1-benzopyran-7-yl)-thiophosphate (Coumaphos)
O,O-diethyl-7-hydroxy-3,4-tetramethylenecoummarinyl-thiophosphate (Coumithoat)
2,3-para-dioxanedithiol-S,S-bis(O,O-diethyldithiophosphate) (Dioxathion)
2-methoxy-4-H-1,3,2-benzodioxaphosphorine-2-sulphide
O,O-diethyl-O-(5-phenyl-3-isooxyzolyl)thiophosphate
S-[(6-chloro-2-oxo-3-benzoxazolinyl)methyl]O,O-diethyldithiophosphate (Phosalon)
2-(diethoxyphosphynylimino)-4-methyl-1,3-dithiolan
O,O-dimethyl-S-[2-methoxy-1,3,4-thiadiazol-5-(4H)-onyl-(4)-methyl]dithiophosphate
tris-(2-methyl-1-aziridinyl)-phosphine oxide (Metepa)
O,O-dimethyl-S-phthalimidomethyldithiophosphate
S-(2-chloro-1-phthalimidoethyl)-O,O-diethyldithiophosphate
N-hydroxynaphthalimidodiethylphosphate
dimethyl-3,5,6-trichloro-2-pyridylphosphate
O,O-dimethyl-O-(3,5,6-trichloro-2-pyridyl)thiophosphate
O,O-diethyl-O-(3,5,6-trichloro-2-pyridyl)thiophosphate
O,O-diethyl-O-2-pyrazinylthiophosphate (Thionazin)
O,O-dimethyl-O-(2-isopropyl-4-methyl-6-pyrimidyl)thiophosphate (Diazinon)
O,O-diethyl-O-(2-quinoxylyl)thiophosphate
O,O-dimethyl-S-(4-oxo-1,2,3-benzotriazin-3(4H)-yl-methyl)-dithiophosphate (Azinphosmethyl)
O,O-diethyl-S-(4-oxo-1,2,3-benzotriazin-3(4H)-yl-methyl)-dithiophosphate (Azinphosaethyl)

S-[(4,6-diamino-s-triazin-2-yl)methyl]-O,O-dimethyl-dithiophosphate (Menazon)
S-[2-(ethylsulphonyl)ethyl]-dimethylthiolphosphate (Dioxydemeton-s-methyl)
diethyl-S-[2-(ethylsulphynyl)ethyl]dithiophosphate (Oxydisulfoton)
bis-O,O-diethylthiophosphoric anhydride (Sulfotep)
dimethyl-1,3-di(carbomethoxy)-1-propen-2-yl-phosphate
dimethyl-(2,2,2-trichloro-1-butyoyloxyethyl)phosphonate (Butonat)
O,O-dimethyl-O-(2,2-dichloro-1-methoxyvinyl)phosphate
O,O-dimethyl-O-(3-chloro-4-nitrophenyl)thiophosphate (Chlorthion)
O,O-dimethyl-O(or S)-2-(ethylthioethyl)thiophosphate (Demeton-S-methyl)
bis-(dimethylamido)fluorophosphate (Dimefox)
2-(O,O-dimethylphosphorylthiomethyl)-5-methoxy-pyrone-4
3,4-dichlorobenzyltriphenylphosphonium chloride
dimethyl-N-methoxymethylcarbamoylmethyldithiophosphate (Formocarbam)
O,O-diethyl-O-(2,2-dichloro-1-chloroethoxyvinyl)phosphate
O,O-dimethyl-O-(2,2-dichloro-1-chloroethoxyvinyl)phosphate
O-ethyl-S,S-diphenyldithiolphosphate
O-ethyl-S-benzylphenyldithiophosphonate
O,O-diethyl-S-benzylthiolphosphate
O,O-dimethyl-S-(4-chlorophenylthiomethyl)dithiophosphate (Methylcarbophenothion)
O,O-dimethyl-S-(ethylthiomethyl)dithiophosphate
diisopropylaminofluorophosphate (Mipafox)
O,O-dimethyl-S-(morpholinylcarbamoylmethyl)dithiophosphate (Morphothion)
bismethylamidophenylphosphate
O,O-dimethyl-S-(benzenesulphonyl)dithiophosphate
O,O-dimethyl-(S and O)-ethylsulphynylethylthiophosphate
O,O-diethyl-O-4-nitrophenylphosphate
O,O-diethyl-S-(2,5-dichlorophenylthiomethyl)dithiophosphate (Phendapton)
triethoxyisopropoxy-bis(thiophosphinyl)disulphide
O,O-diethyl-O-(4-methylcoumarinyl-7)-thiophosphate (Potasan)
2-methoxy-4H-1,3,2-benzodioxaphosphorine-2-oxide
octamethylpyrophoramide (Schradan)
bis(dimethoxythiophosphinylsulphido)-phenylmethane
5-amino-bis(dimethylamido)phosphinyl-3-phenyl-1,2,4-triazole (Triamiphos)
N-methyl-5-(O,O-dimethylthiolphosphoryl)-3-thiavaleramide (Vamidothion)
N,N,N',N'-tetramethyldiamidofluorophosphate (Dimefox)

CARBAMIC ACID DERIVATIVES 1-naphthyl-N-methylcarbamate (Carbaryl)
2-butinyl-4-chlorophenylcarbamate
4-dimethylamino-3,5-xylyl-N-methylcarbamate
4-dimethylamino-3-tolyl-N-methylcarbamate (Aminocarb)
4-methylthio-3,5-xylyl-N-methylcarbamate (Methiocarb)
3,4,5-trimethylphenyl-N-methylcarbamate
2-chlorophenyl-N-methylcarbamate (CPMC)
5-chloro-6-oxo-2-norbornanecarbonitrile-O-(methylcarbamoyl)-oxime
1-(dimethylcarbamoyl)-5-methyl-3-pyrazolyl-N,N-dimethylcarbamate (Dimetilan)
2,3-dihydro-2,2-dimethyl-7-benzofuranyl-N-methylcarbamate (Carbofuran)
2-methyl-2-methylthiopropionaldehyde-O-(methylcarbamoyl)-oxime (Aldicarb)
8-quinaldyl-N-methylcarbamate and the salts thereof
methyl-2-isopropyl-4-(methylcarbamoyloxy)carbanilate
meta-(1-ethylpropyl)phenyl-N-methylcarbamate
3,5-di-tert. butyl-N-methylcarbamate
meta-(1-methylbutyl)phenyl-N-methylcarbamate
2-isopropylphenyl-N-methylcarbamate
2-sec. butylphenyl-N-methylcarbamate
meta-tolyl-N-methylcarbamate
2,3-xylyl-N-methylcarbamate
3-isopropylphenyl-N-methylcarbamate
3-tert. butylphenyl-N-methylcarbamate
3-sec. butylphenyl-N-methylcarbamate
3-isopropyl-5-methylphenyl-N-methylcarbamate (Promecarb)
3,5-diisopropylphenyl-N-methylcarbamate
2-chloro-5-isopropylphenyl-N-methylcarbamate
2-chloro-4,5-dimethylphenyl-N-methylcarbamate
2-(1,3-dioxolan-2-yl)phenyl-N-emthylcarbamate (Dioxycarb)
2-(4,5-dimethyl-1,3-dioxolan-2-yl)phenyl-N-methylcarbamate
2-(1,3-dioxan-2-yl)phenyl-N-methylcarbamate
2-(1,3-dithiolan-2-yl)phenyl-N-methylcarbamate
2-(1,3-dithiolan-2-yl)phenyl-N,N-dimethylcarbamate
2-isopropoxyphenyl-N-methylcarbamate (Aprocarb)
2-(2-propinyloxy)phenyl-N-methylcarbamate
3-(2-propinyloxy)phenyl-N-methylcarbamate
2-dimethylaminophenyl-N-methylcarbamate
2-diallylaminophenyl-N-methylcarbamate
4-diallylamino-3,5-xylyl-N-methylcarbamate (Allyxicarb)
4-benzothienyl-N-methylcarbamate
2,3-dihydro-2-methyl-7-benzofuranyl-N-methylcarbamate
3-methyl-1-phenylpyrazol-5-yl-N,N-dimethylcarbamate
1-isopropyl-3-methylpyrazol-5-yl-N,N-dimethylcarbamate (Isolan)
2-(N',N'-dimethylcarbamoyl)-3-methylpyrazol-5-yl-N,N-dimethylcarbamate
2-dimethylamino-5,6-dimethylpyrimidin-4-yl-N,N-dimethylcarbamate
3-methyl-4-dimethylaminomethyleneiminophenyl-N-methylcarbamate
3-dimethylaminomethyleneiminophenyl-N-ethyl-carbamate
1-methylthioethylimino-N-methylcarbamate (Methoxymyl)
2-methylcarbamoyloxyimino-1,3-dithiolan
5-methyl-2-methylcarbamoyloximino-1,3-oxathiolan
2-(1-methoxy-2-propoxy)phenyl-N-methylcarbamate
2-(1-butin-3-yl-oxy)phenyl-N-methylcarbamate
3-methyl-4-(dimethylaminomethylmercaptomethyleneimino)phenyl-N-methylcarbamate
1,3-bis(carbamoylthio)-2-(n,N-dimethylamino)-propane hydrochloride
5,5-dimethylhydroresorcinoldimethylcarbamate
2-[propargylethylamino]-phenyl-N-methylcarbamate
2-[propargylmethylamino]-phenyl-N-methylcarbamate
3-methyl-4-[dipropargylamino]-phenyl-N-methyl-
2-[dipropargylamino]-phenyl-N-methylcarbamate
3-methyl-4-[dipropargylamino]-phenyl-N-methylcarbamate
3,5-dimethyl-4-[dipropargylamino]-phenyl-N-methyl-carbamate
2-[allylisopropylamino]-phenyl-N-methylcarbamate
3-[allylisopropylamino]-phenyl-N-methylcarbamate

CHLORINATED HYDROCARBONS

γ-hexachlorocyclohexane [gammexane; lindane; γHCH]
1,2,4,5,6,7,8,8-octachloro-3α,4,7,7α'tetrahydro-4,7-methyleneindane [chlordan]
1,4,5,6,7,8,8-heptachloro-3α,4,7,7α-tetrahydro-4,7-methyleneindane [heptachlor]
1,2,3,4,10,10-hexachloro-1,4,4α,5,8,8α-hexahydroendo-1,4-exo-5,8-dimethanonaphthalene [aldrin]
1,2,3,4,10,10-hexachloro-6,7-epoxy-1,4,4α,5,6,7,8,8α-9-octahydro-exo-1,4-endo-5,8-dimethanonenaphthalene [dieldrin] endo-5,8-endo-endonaphthalene [endrin]

6,7,8,9,10,10-hexachloro-1,5,5α,6,9,9α-hexahydro-6,9-
  methano-2,3,4-benzo[e]-dioxathipene-3-oxide [endo-
  sulphur hydride]
chlorinated champhor [toxaphene]
decachloroctahydro-1,3,4-metheno-2H-cyclobuta[e d]
  pentalen-2-one
dodecachloroctahydro-1,3,4-metheno-1H-cyclobuta[c d]
  pentalene [mirex]
ethyl-1,1α,3,3α,4,5,5α,5α,6-decachloroctahydro-2-
  hydroxy-1,3,4-metheno-1H-cyclobuta[c d] pentalene-2-
  levulinate
bis(pentachloro-2,4-cyclopentadien-1-yl)
dinoctone-o
1,1-trichloro-2,2-bis(para-chlorophenyl)ether [DDT]
dichlorodiphenyl-dichloroethane [TDE]
di(para-chlorophenyl)-trichloromethylcarbinol [Dicofol]
ethyl-4,4'-dichlorophenylglycolate [chlorobenzylate]
ethyl-4,4'-dibromobenzylate [bromobenzylate]
ispropyl-4,4'-dichlorobenzylate
1,1,1-trichloro-2,2,bis(para-methoxyphenyl)ethane
  [methoxychlor]
diethyl-diphenyl-dichloroethane
decachloropentacyclo(3,3,2,0$^{2,6}$,0$^{3,9}$,0$^{7,10}$)decan-4-one
  [chlordecon]

NITROPHENOLS AND DERIVATIVES 4,6-dinitro-6-methylphenol, sodium salt [dinitrocresol]
dinitrobutylphenol 2,2',2'')-triethanolamine salt
2-cyclohexyl-4,6-dinitrophenol [dinex]
2-(1-methylheptyl)-4,6-dinitrophenyl-crotonate
  [dinocap]
2-sec.butyl-4,6-dinitrophenyl-3-methylbutenoate
  [binapacryl]
2-sec.butyl-4,6-dinitrophenyl-cyclopropionate
2-sec.butyl-4,6-dinitrophenylisopropylcarbonate [dino-
  buton]

VARIOUS sabadilla
rotenone
cevadine
veratridine
ryania
pyrethrin
3-allyl-2-methyl-4-oxo-2-cyclopenten-1-yl-chysanthemu-
  mate (allethrin)
6-chloropiperonyl-chrysanthemumate (barthrin)
2,4-dimethylbenzyl-chrysanthemumate (dimethrin)
2,3,4,5-tetrahydrophthalimidomethylchrysanthemumate
(5-benzyl-3-furyl)-methyl-2,2-dimethyl-3-(2-methyl-
  propanyl) cyclopropanecarboxylate
nicotine

BACILLUS THURINGEINSIS BERLINER dicyclohexylcarbodiimide
diphenyldiimide [azobenzene]
4-chlorobenzyl-4-chlorophenylsulphide [chlorobenside]
creosote oil
6-methyl-2-oxo-1,3-dithiolo-[4,5-b]-quinoxaline (quino-
  methionate)
(I)-3-(2-furfuryl)-2-methyl-4-oxocyclopent-2-enyl(I)-
  (cis-trans)chrysanthemum-monocarboxylate
  [furethrin]
2-pivaloyl-indane-1,3-dione [pindon]
2-fluoroethyl(4-bisphenyl)acetate
2-fluoro-N-methyl-N(1-naphthyl)-acetamide
pentachlorophenol and salts
2,2,2-trichloro-N-(pentachlorophenyl)-acetimidoyl
  chloride
N'-(4-chloro-2-methylphenyl)-N,N-dimethylformamidine
  (chlorophenamidine)
4-chlorobenzyl-4-fluorophenyl sulphide (fluorbenside)
5,6-dichloro-1-phenoxycarbanyl-2-trifluoromethylbenz-
  imidazole (fenozaflor)
tricyclohexyl tin hydroxide
2-thiocyanatoethyllauric acid ester
β-butoxy-β'-thiocyanatodiethylether
isobornylthiocyanato acetate
para-chlorophenyl-para-chlorobenzenesulphonate (ovex)
2,4-dichlorophenylbenzenesulphonate
para-chlorophenylbenzenesulphonate (fenson)
para-chlorophenyl-2,4,5-trichlorophenylsulphone (tetra-
  difon)
para-chlorophenyl-2,4,5-trichlorophenylsulphide
  (tetrasul)
methylbromide
para-chlorophenylphenylsulphone
para-chlorobenzyl-para-chlorophenylsulphide (chloro-
  benside)
4-chlorophenyl-2,4,5-trichlorophenylazosulphide
2-(para-tert.-butylphenoxy)-1-methylethyl-2-chloroethyl
  sulphite
2-(para-tert.-butylphenoxy)cyclohexyl-2-propionyl
  sulphite
4,4'-dichloro-N-methylbenzenesulphoneanilide
N-(2-fluoro-1,1,2,2-tetrachloroethylthio)-methane-
  sulphoneanilide
2-thio-1,3-dithiolo-(4,5,6)-quinoxaline (thioquinox)
chloromethyl-para-chlorophenylsulphone (lauseto new)
1,3,6,8-tetranitrocarbazole
prop-2-ynyl-(4-t-butylphenoxy)-cyclohexyl sulphite
  (propargil)

The new compounds of Formula I are prepared by a process similar to the Michaelis-Arbuzov reaction by reacting a compound of trivalent phosphorus of the formula

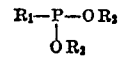

in which $R_1$ and $R_1$ have the meanings ascribed to them in Formula I, with a trichloroacetamide of the formula

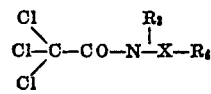

with elimination of $R_2$—Cl, when Y in Formula I stands for Cl, or with a dichloroacetamide of the formula

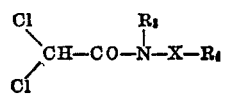

with elimination of $R_2$—Cl, when Y in Formula I stands for H, $R_3$, X and $R_4$ having the meanings ascribed to them in Formula I.

The reaction is preferably carried out in a solvent that is inert to the reactants, for example, benzene, xylene, toluene, dioxane or cymene.

EXAMPLE 1

Preparation of starting products

N-trichloroacetyl - N - acetanilide: 72.7 grams of trichloroacetyl chloride were added dropwise within 30 minutes at 15 to 20° C. to a mixture of 54.1 grams (0.4 mol) of acetanilide +300 mols of toluene +40.5 grams of triethylamine, while stirring well. The reaction mixture was then stirred for 2 hours at room temperature. Triethylaminohydrochloride was removed by vacuum filtration and the solvent was distilled from the filtrate. 108 grams (96% of the theoretical yield). The residue was recrystallized from hexane. Yellowish crystals melting at 64° C.

For $C_{10}H_8Cl_3NO_2$.—Calculated (percent): Cl, 37.9; N, 5.0. Found (percent): Cl, 36.5; N, 5.1.

The following compounds were produced by the same method:

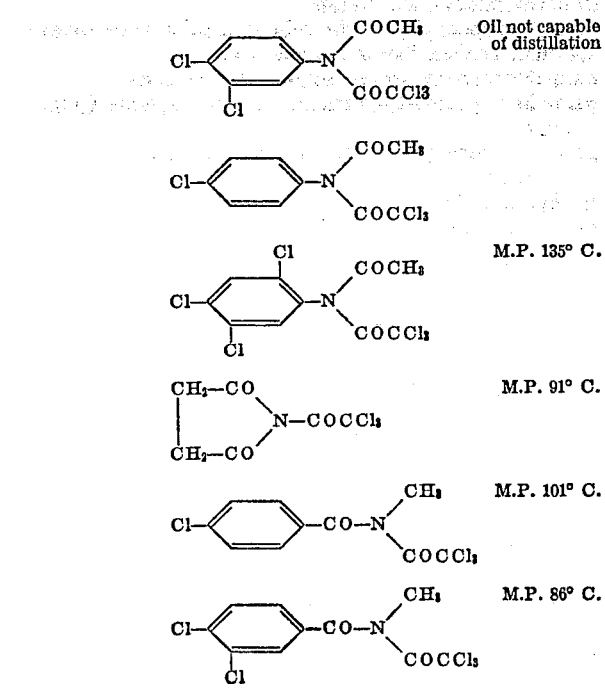

EXAMPLE 2

Preparation of dichlorovinylphosphates of Formula I

O,O-dimethyl - 1 - (N-methyl - N - benzoylamino)-2,2-dichlorovinylphosphate [Compound No. 1]: 68.9 grams of N-methyl-N-trichloroacetylbenzamide were dissolved in 150 ml. of toluene. 31 grams of trimethylphosphite were added dropwise to this solution within 20 minutes. The temperature rose from 25° C. to 60° C. After completion of the exothermic reaction, the reaction mixture was kept at 70° C. for 2 hours. The solvent was removed by distillation and 85.5 grams (98.1% of the theoretical yield) of a yellowish brown oil remained that could not be distilled, even in a high vacuum. $n_D^{24}$ 1.5220

For $C_{12}H_{14}Cl_2NO_5P$.—Calculated (percent): P, 8.8; N, 4.0. Found (percent): P, 8.7; N, 4.2.

The following compounds were produced by the same method:

Active principle No.

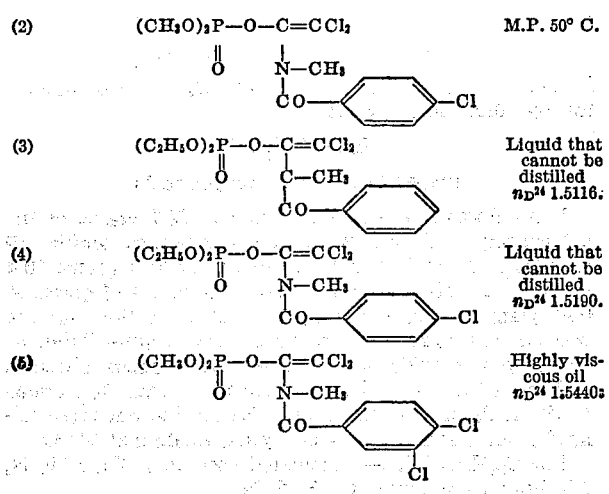

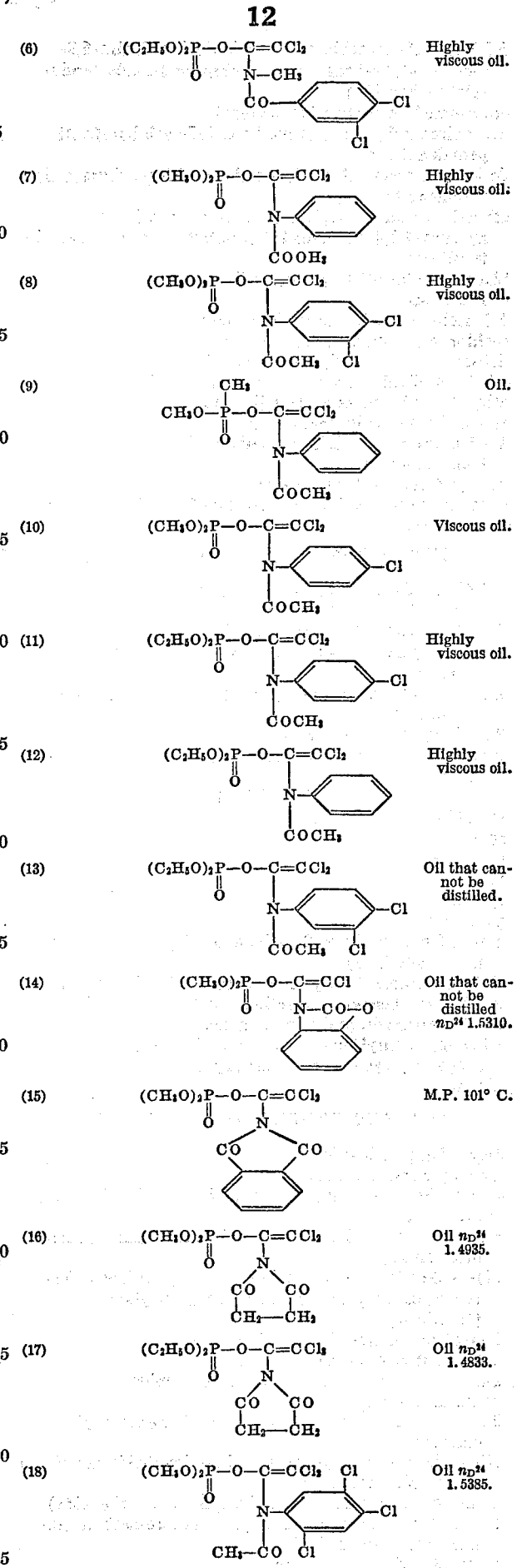

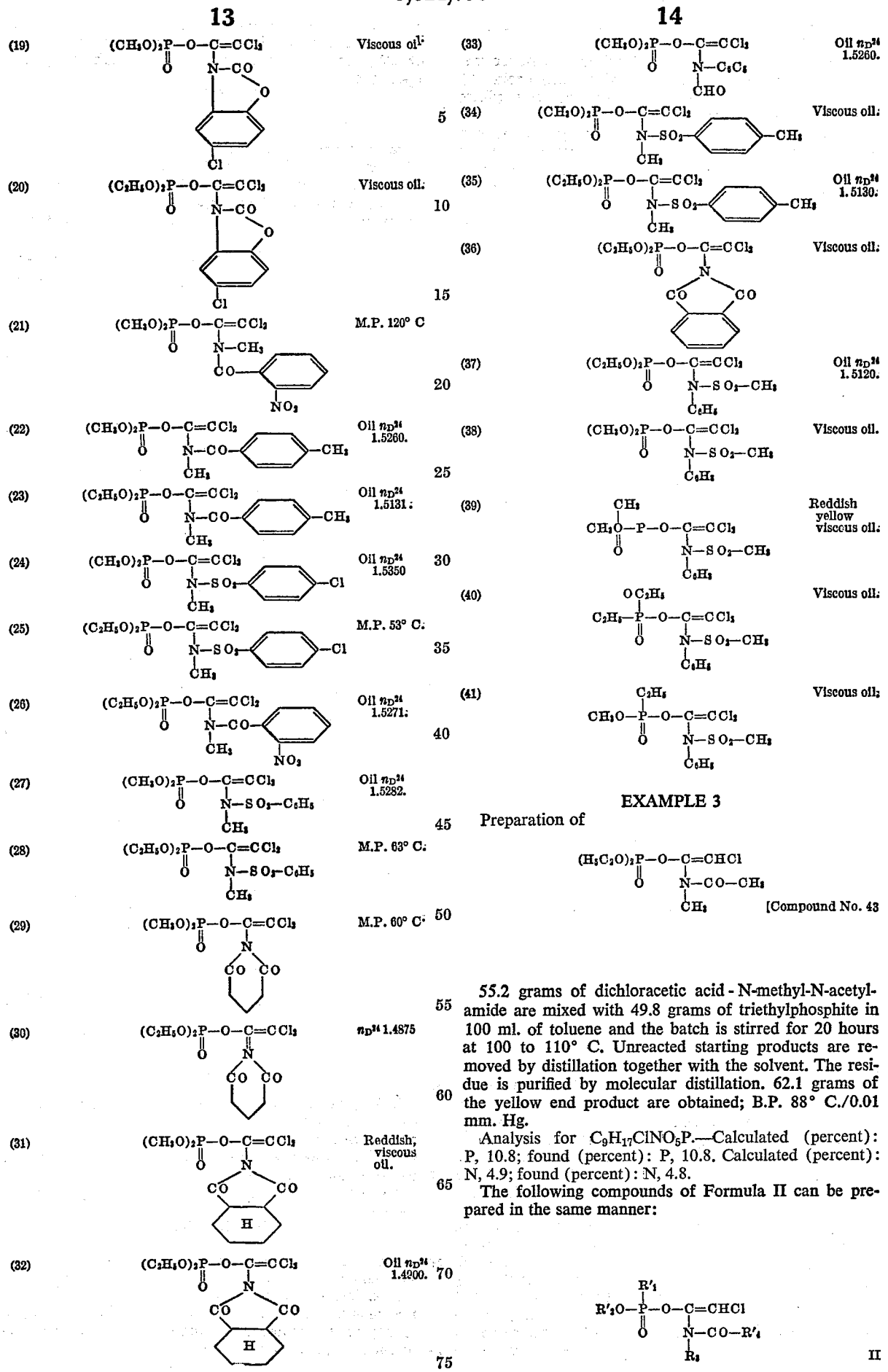

EXAMPLE 3

Preparation of $$(H_5C_2O)_2P(O)-O-C(=CHCl)-N(CH_3)-CO-CH_3$$

[Compound No. 43]

55.2 grams of dichloracetic acid - N-methyl-N-acetyl-amide are mixed with 49.8 grams of triethylphosphite in 100 ml. of toluene and the batch is stirred for 20 hours at 100 to 110° C. Unreacted starting products are removed by distillation together with the solvent. The residue is purified by molecular distillation. 62.1 grams of the yellow end product are obtained; B.P. 88° C./0.01 mm. Hg.

Analysis for $C_9H_{17}ClNO_5P$.—Calculated (percent): P, 10.8; found (percent): P, 10.8. Calculated (percent): N, 4.9; found (percent): N, 4.8.

The following compounds of Formula II can be prepared in the same manner:

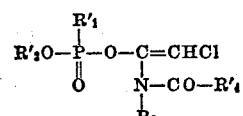

| Comp. no. | R'1 | R'2 | R3 | R4 | Property |
|---|---|---|---|---|---|
| 42 | CH3O- | CH3 | CH3 | CH3 | B.P. 86° C./0.02 mm. Hg. |
| 43 | C2H5O- | C2H5- | CH3 | CH3 | B.P. 88° C./0.01 mm. Hg. |
| 44 | C3H7O- | C3H7 | CH3 | CH3 | Oil. |
| 45 | CH3 | CH3 | CH3 | CH3 | Oil. |
| 46 | C2H5 | C2H5 | CH3 | CH3 | Oil. |
| 47 | CH3O | CH3 | C2H5 | CH3 | Viscous oil. |
| 48 | C2H5O | C2H5 | C2H5 | CH3 | Oil. |
| 49 | CH3O | CH3 | CH3 | C2H5 | Reddish oil. |
| 50 | C2H5O | C2H5 | CH3 | C2H5 | Oil. |
| 51 | CH3O | CH3 | CH3 | —CH(CH2)(CH2) | Oil. |
| 52 | C2H5O | C2H5 | CH3 | Same as above | B.P. 100° C./0.001 mm. Hg. |
| 53 | CH3 | CH3 | CH3 | do | Viscous oil. |
| 54 | C2H5 | C2H5 | CH3 | do | Do. |
| 55 | CH3O | CH3 | CH3 | —C6H5 | Oil. |
| 56 | C2H5O | C2H5 | CH3 | —C6H4Cl(p) | Oil. |
| 57 | CH3O | CH3 | CH3 | H | 85° C./0.05 mm. Hg. |
| 58 | C2H5O | C2H5 | CH3 | H | 80° C./0.05 mm. Hg. |
| 59 | C2H5 | C2H5 | CH3 | H | Oil. |
| 60 | CH3 | CH3 | CH3 | H | Oil. |
| 61 | CH3O | CH3 | C2H5 | H | Viscous oil. |
| 62 | C2H5O | C2H5 | C2H5 | H | Oil. |
| 63 | C2H5 | C2H5 | C2H5 | H | Reddish yellow oil. |
| 64 | CH3 | CH3 | C2H5 | H | Oil. |
| 65 | C2H5O | C2H5 | C2H5 | H | Viscous oil. |
| 66 | C2H5O | C2H5 | Cyclopropyl | H | Do. |
| 67 | C2H5O | C2H5 | C6H5 | H | Oil. |
| 68 | C2H5O | C2H5 | C6H4Cl(p) | H | Oil. |
| 69 | C2H5O | C2H5 | C6H5 | CH3 | Oil. |
| 70 | C2H5O | C2H5 | C6H4Cl(p) | CH3 | Yellow oil. |
| 71 | C2H5O | C2H5 | —CH(CH2)(CH2) | —CH(CH2)(CH2) | Brown oil. | and also those in which $R_3$ and $R'_4$ form a ring together with $$-N-CO-:-$$

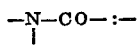

| Comp. no. | R'1 | R'2 | R3 | Property |
|---|---|---|---|---|
| 72 | C2H5O | C2H5 | —N(CO—CH2)(CH2-CH2) | B.P. 90° C./0.01 mm. Hg. |
| 73 | C2H5O | C2H5 | Same as above | Viscous oil. |
| 74 | CH3O | CH3 | do | B.P. 90° C./0.02 mm. Hg. |
| 75 | CH3O | CH3 | do | Viscous oil. |
| 76 | C2H5 | C2H5 | do | Do. |

The following N-sulphonated compounds of Formula IV are prepared in an analogous manner:

$$R'_2O-\overset{R'_1}{\underset{\overset{\parallel}{O}}{P}}-O-C=CHCl$$
$$\underset{R_3}{N-SO_2-R'_4}$$
(IV)

| Comp. number | R'1 | R'2 | R3 | R'4 | Property |
|---|---|---|---|---|---|
| 77 | C2H5O | C2H5 | CH3 | CH3 | Oil. |
| 78 | C2H5O | C2H5 | C2H5 | CH3 | Yellow oil. |
| 79 | C2H5O | C2H5 | C6H5 | CH3 | Do. |
| 80 | C2H5O | C2H5 | CH3 | —C6H4Cl(p) | Oil. |

EXAMPLE 4

Formulations

Dusting preparations: Equal parts of one of the active principles of the invention and precipitated silica are finely ground. Dusting preparation, preferably having an active principle content of 1 to 6%, can be prepared therefrom by admixture with kaolin or talcum.

Wettable powder: To prepare a wettable powder, the following components, for example, are mixed and then finely ground:

50 parts of an active principle of the invention
20 parts of highly adsorptive silica
25 parts of Bolus alba (kaolin)
3.5 parts of sodium 1-benzyl-2-stearylbenzimidazole-6,3'-disulphonate Emulsion concentrate: An emulsion concentrate can be prepared in the following manner, using active principles having good solubility:

A mixture is prepared from 20 parts of active principle
10 parts of xylene
10 parts of a mixture consisting of a reaction product derived from an alkylphenol and ethylene oxide and calcium dodecylbenzenesulphonate.

An emulsion spray can be prepared by diluting the mixture to the required concentration with water.

Granulates: 7.5 grams of one of the active principles of Formula I are dissolved in 100 ml. of acetone and the solution so obtained is applied to 92 grams of granulated attapulgite (mesh size: 24/38 meshes per inch). The batch is well mixed and the solvent is removed in a rotational evaporator. A granulate having an active principle content of 7.5% is obtained.

EXAMPLE 5

Contact action on *Certitis capitata*

A series of solutions were prepared by dissolving substances 42, 43, 52, 57, 58, 72 and 74 in acetone. Six solutions were prepared of each substance, the strengths being 1,000, 100, 10, 5, 2.5 and 1.25 p.p.m. of active principle respectively. The bottom halves of Petri dishes were treated with 10 ml. each of the solutions. After the solvent had evaporated, supercooled flies were placed in the Petri dishes and covered with the top halves of the dishes. Each dish contained 10 flies. After 1 hour, the degree of kill was assesed in respect of all concentrations.

| Substance | Ceratitis capitata percent | | | | | | |
|---|---|---|---|---|---|---|---|
|  | 52 | 57 | 58 | 42 | 43 | 72 | 74 |
| Conc., p.p.m.: | | | | | | | |
| 1,000 | 100 | 100 | 100 | 100 | 100 | 100 | 100 |
| 100 | 100 | 100 | 100 | 100 | 100 | 100 | 100 |
| 10 | 100 | 100 | 100 | 100 | 100 | 100 | 100 |
| 5 | 100 | 100 | 100 | 100 | 100 | 100 | 100 |
| 2.5 | 40 | 100 | 100 | 50 | 100 | 50 | 100 |
| 1.25 | 0 | 100 | 100 | 50 | 50 | 50 | 50 |

EXAMPLE 6

Contact action on *Apis fabae*

Method: Young *Vicia faba* plants having a height of about 6 cm are infested with parts of plants attacked by *Aphis fabae*. The conditions are right for the tests after the plants have grown for a further 5 days and the aphid population has increased accordingly. To test the contact action, the plants are sprayed from all sides with different concentrations of the active principles, the maximum concentration being 800 p.p.m. The sprayer used is the kind employed in chromatography. The action is assessed after 2 days.

The percentage of mortality in respect of the various compounds is as follows:

|  | 7 | 42 | 43 | 58 | 74 | 16 | 17 |
|---|---|---|---|---|---|---|---|
|  | Percent | | | | | | |
| Conc., p.p.m.: | | | | | | | |
| 800 | 100 | 100 | 100 | 100 | 100 | 100 | 100 |
| 400 | 100 | 100 | 100 | 100 | 100 | 100 | 100 |
| 200 | 100 | 100 | 100 | 100 | 100 | 100 | 100 |
| 100 | 100 | 100 | 100 | 100 | 100 | 100 | 100 |

EXAMPLE 7

Action on larvae of *Epilachna varivestis*

Method: Young Phaseolus plants are immersed in aqueous solutions of the active principles, the concentrations being 100, 400, 200 and 100 p.p.m. respectively. The plants are allowed to dry and then each one is infested with 5 larvae of *Epilachna varivestis* at the L4 stage. Each plant is covered with a plastic bag.

The percentage kill in respect of the various compounds is assessed after 5 days.

|  | 42 | 27 | 43 | 30 | 58 | 74 | 52 |
|---|---|---|---|---|---|---|---|
|  | Percent | | | | | | |
| Conc., p.p.m.: | | | | | | | |
| 800 | 100 | 100 | 100 | 100 | 100 | 100 | 100 |
| 400 | 100 | 100 | 100 | 100 | 100 | 100 | 100 |
| 200 | 100 | 100 | 100 | 100 | 100 | 100 | 100 |
| 100 | 100 | 100 | 80 | 80 | 80 | 80 | 80 |

EXAMPLE 8

Effect on *Tetranychus urticae*

Method: Phaseolus plants at the two-leaf stage are infested with *Tetranychus urticae* by contact with pieces of leaves attacked therewith, infestation being effected 12 hours prior to treatment. After 12 hours, a population comprising all stages is present in the plants. The active principles in the form of a wettable powder are sprayed on the plants by means of a fine sprayer in a manner such that an even coating of droplets is formed on the surface of the leaves.

The active principles are applied in a concentration of 800 p.p.m. and the mortality in respect of all stages of development is assessed after 2 days and 7 days. In cases where a 100% kill is achieved after 2 days, the plant is re-infested.

|  | After 2 days, percent | | After 7 days, percent | |
|---|---|---|---|---|
|  | Adults | Larvae | Adults | Larvae |
| Comp. number: | | | | |
| 42 | 100 | 100 | 100 | 60 |
| 43 | 100 | 100 | 100 | 60 |
| 72 | 0 | 0 | 100 | 80 |
| 74 | 100 | 100 | 100 | 0 |
| 15 | 100 | 100 | 100 | 100 |
| 4 | 100 | 100 | 100 | 100 |
| 25 | 100 | 100 | 100 | 100 |

EXAMPLE 9

Effect on ectoparasites and vectors (a) *Rhipicephalus bursa*: The tests are carried out with hungry adult ticks. Five ticks are introduced into each of the test-tubes and immersed for 1 to 2 minutes in 2 ml. of an aqueous emulsion containing 100 p.p.m. of the substance under test. Each tube is closed with a standardized plug of cotton wool and then inverted to allow the plug to absorb the active-principle emulsion. Assessment is made after 2 weeks.

A similar test is carried out with Rhipicephalus larvae.

(b) *Boophilus microplus* (larvae): About 10 to 20 larvae are treated as per Test (a) with dilutions of an active principle. Assesment is made after 2 weeks.

(c) *Lucilia sericata* (larvae): A dilution series is prepared from an emulsion concentrate of an active principle. 2 millilitres each of the concentrations are mixed with 2 grams of minced horsemeat in 10 ml. glass vessels. 20 to 30 of freshly hatched larvae are then introduced into each of the glass vessels. Assesment is made after 2 hours.

(d) *Aedes aegypti* (larvae): L-1-larvae of the yellow fever mosquito are kept for 24 hours in 10 ml. each of different concentrations of an emulsifiable active-principle formulation. Assessment is then made.

(e) *Aedes aegypti* (♀): Adult mosquitoes are exposed for 6 hours to a coating of spray formed by a solution of an active compound in acetone. The effect is then assessed. The concentrations giving a 100% kill are expressed in mg. AS/dish.

The results of Tests (a) to (e) shown in the following Table refer to the lowest concentrations giving a 100% kill.

TABLE $LC_{100}$ in p.p.m. or in mg. AS/dish

| Comp. No. | R. bursa | | B. microplus larvae | L. sericata, larvae | A. aegypi | |
|---|---|---|---|---|---|---|
|  | Adult | Larvae | | | Larvae | Adult |
| 14 | 100 | 100 | 10 | 6 | 0.06 | 0.1 |
| 1 | 100 | 100 | 10 | 12 | 0.12 | 0.1 |
| 7 | 10 | 10 | 0.5 | 0.75 | 0.03 | 0.01 |
| 15 | 100 | 10 | 5 | 6 | — | — |
| 3 | 100 | 10 | 10 | — | — | — |
| 12 | 50 | 10 | 50 | — | — | 0.1 |
| 16 | 100 | 100 | 100 | 1.5 | — | — |
| 17 | 100 | 100 | 100 | 0.75 | — | — |
| 23 | 100 | 50 | 10 | — | — | — |
| 28 | 10 | 5 | 50 | 24 | — | — |
| 29 | 10 | 100 | 100 | 1.5 | 0.25 | — |
| 30 | 100 | 100 | 100 | 1.5 | 0.5 | — |
| 33 | 10 | 10 | 10 | — | 0.1 | — |
| 36 | 100 | 10 | 10 | 3 | 0.25 | — |
| 38 | 100 | 100 | 100 | 0.75 | — | — |
| 72 | 10 | 10 | 10 | 1.5 | — | .001 |
| 37 | 50 | 5 | 10 | 2 | — | — |
| 43 | 10 | 10 | 10 | 0.75 | — | 0.001 |
| 42 | 50 | 50 | 50 | 0.75 | 0.25 | 0.001 |
| 74 | 100 | 100 | 100 | 0.38 | 0.5 | 0.001 |
| 57 | 100 | — | — | 0.75 | 0.125 | — |
| 58 | 10 | 10 | 10 | 1.5 | 0.5 | 0.01 |
| 52 | 10 | 50 | 10 | 6 | — | 0.01 |

NOTE —=not tested.

EXAMPLE 10.—EFFECT ON PESTS HARMFUL TO STORED PRODUCTS

Minimum amount of active substance in mg. per m.² of a dusting formulation for 100% kill after 24 hours' exposure

| Comp. number: | Phyllo-dromia germanica | Peri-planeta ameri-cana | Blatta orien-talis | Tenebrio molitor Imago | Tenebrio molitor Larva | Dermestes frischii Imago | Dermestes frischii Larva | Attegenus piceus, L-5 larva | Acheta domes-ticus, L-5 larva | Sitophilus granarius |
|---|---|---|---|---|---|---|---|---|---|---|
| 1 | 100 | — | — | — | — | — | — | — | — | — |
| 7 | 3 | 25 | 50 | 12 | 25 | 50 | 25 | 50 | 12 | 12 |
| 15 | 25 | 50 | — | — | — | 50 | 25 | 25 | 25 | 25 |
| 8 | 25 | — | — | 50 | 100 | — | — | 100 | — | — |
| 2 | 25 | 100 | — | 100 | — | — | — | — | 100 | — |
| 4 | 100 | — | — | — | — | — | — | — | — | — |
| 42 | 12 | 50 | 100 | 50 | 100 | 50 | 50 | 200 | 50 | 50 |
| 43 | 25 | 50 | 100 | 25 | 50 | 100 | 50 | 200 | 25 | 100 |
| 72 | 25 | 100 | 100 | 50 | 50 | 100 | 100 | 200 | 50 | 200 |
| 74 | 25 | 200 | 100 | 12 | 50 | 100 | 50 | 200 | 12 | 50 |

We claim:
1. An insecticidal and nematicidal composition comprising (1) as active ingredient, an insecticidally and nematicidally effective amount of a compound of the formula

$$R_2O-\underset{\underset{O}{\|}}{\overset{R_1}{P}}-O-C=CHCl$$
$$\underset{\diagdown CO}{N}$$

wherein $R_1$ is methoxy and $R_2$ is methyl or wherein $R_1$ is ethoxy and $R_2$ is ethyl, and (2) a suitable carrier.

2. The composition of claim 1 in which $R_1$ is methoxy and $R_2$ is methyl.

3. The composition of claim 1 in which $R_1$ is ethoxy and $R_2$ is ethyl.

4. A method for combatting insects and nematodes comprising applying thereto an insecticidally and nematicidally effective amount of a compound of the formula $$R_2O-\underset{\underset{O}{\|}}{\overset{R_1}{P}}-O-C=CHCl$$
$$\underset{\diagdown CO}{N}$$

wherein $R_1$ is methoxy and $R_2$ is methyl or wherein $R_1$ is ethoxy and $R_2$ is ethyl.

5. The methoxy of claim 4 in which $R_1$ is methoxy and $R_2$ is methyl.

6. The method of claim 4 in which $R_1$ is ethoxy and $R_2$ is ethyl.

References Cited
UNITED STATES PATENTS
3,183,258  5/1965  Schuler et al. _____ 260—326.5 A ALBERT T. MEYERS, Primary Examiner
A. J. ROBINSON, Assistant Examiner U.S. Cl. X.R.
424—212, 215, Dig. 12